United States Patent [19]

Okumori et al.

[11] Patent Number: 5,061,412

[45] Date of Patent: Oct. 29, 1991

[54] PROCESS FOR PRODUCING A MAGNET OF STRONTIUM FERRITE HAVING HIGH PERFORMANCE

[75] Inventors: Kunio Okumori; Kazuo Terada, both of Mishima, Japan

[73] Assignee: Sumitomo Special Metal Co. Ltd., Osaka, Japan

[21] Appl. No.: 501,883

[22] Filed: Mar. 30, 1990

[30] Foreign Application Priority Data

Mar. 31, 1989 [JP] Japan ................................. 1-81789

[51] Int. Cl.$^5$ ...................... C04B 35/26; C04B 35/64
[52] U.S. Cl. .................... 264/24; 252/62.63; 264/63; 264/118; 264/122; 264/125; 264/DIG. 58
[58] Field of Search ............... 264/24, 108, 109, 112, 264/118, 122, 125, DIG. 58, 56, 63; 423/150, 151, 152, 594, 633; 252/62.54, 62.56, 62.62, 62.63; 148/302; 425/78, 3

[56] References Cited

U.S. PATENT DOCUMENTS

| | | |
|---|---|---|
| 3,855,374 | 12/1974 | Brailowsky et al. .................. 264/24 |
| 4,062,922 | 12/1977 | Olson et al. ............... 264/DIG. 58 |
| 4,411,807 | 10/1983 | Watanabe et al. ............... 252/62.58 |
| 4,457,851 | 7/1984 | Tabaru et al. .......................... 264/24 |

FOREIGN PATENT DOCUMENTS

| | | | |
|---|---|---|---|
| 58-20730 | 2/1983 | Japan | 423/151 |
| 58-190005 | 11/1983 | Japan | 252/62.56 |
| 58-202504 | 11/1983 | Japan | 252/62.56 |
| 61-215220 | 9/1986 | Japan | 252/62.56 |
| 62-21717 | 1/1987 | Japan | 423/150 |
| 62-246822 | 10/1987 | Japan | 423/150 |
| 63-185828 | 8/1988 | Japan | 252/62.56 |
| 619293 | 8/1979 | U.S.S.R. | 264/162 |
| 1258611 | 9/1986 | U.S.S.R. | 252/62.56 |

*Primary Examiner*—Jeffery Thurlow
*Assistant Examiner*—Mathieu Vargot
*Attorney, Agent, or Firm*—Watson, Cole, Grindle & Watson

[57] ABSTRACT

An iron ore or mill scale is crushed to form a powder having an average particle diameter not exceeding 12 microns. The powder is heated at a temperature of 600° C. to 900° C. in the presence of oxygen to form an iron oxide containing at least 98.0% of $Fe_2O_3$. The iron oxide is mixed with strontium oxide or carbonate. The mixture is calcined to form strontium ferrite. The calcined product is pulverized, the crushed material is molded in a magnetic field, and the molded product is sintered to yield a magnet of strontium ferrite having a high level of performance.

5 Claims, No Drawings

PROCESS FOR PRODUCING A MAGNET OF STRONTIUM FERRITE HAVING HIGH PERFORMANCE

BACKGROUND OF THE INVENTION

1. Field of the Invention

This invention relates to a process for producing a magnet of strontium ferrite having high performance from iron oxides obtained from iron are of magnetite or mill scale.

2. Description of the Prior Art

A magnet of strontium ferrite ($SrO.nFe_2O_3$, where n is from 5.0 to 6.2) is produced by a process including the steps of mixing iron oxide obtained from iron ores or mill scale with strontium oxide or carbonate, calcining their mixture, pulverizing the calcined material, molding the pulverized material into a particular shape, and sintering the molded material. When the mixture is calcined, the iron oxide and the strontium oxide or carbonate react with each other to form a ferrite.

The iron ores and mill scale, however, contain a large amount of FeO or $Fe_3O_4$ in addition to $Fe_2O_3$, as is obvious from TABLE 1 showing the composition of each of magnetite and hematite, which are used as iron ores, and mill scale. This necessitates the oxidation of iron ore of magnetite or mill scale in an atmosphere containing oxygen, or in the air to convert it to a source of exclusive supply of $Fe_2O_3$ before mixing it with the strontium oxide or carbonate. The oxidized magnetite or mill scale has, however, so large an average particle diameter that its pulverizing requires a great deal of time, resulting undesirably in a high cost of production and a low level of productivity.

TABLE 1

| Iron ores | T.Fe | FeO | $Fe_2O_3$ | $Fe_3O_4$ | $SiO_2$ | $Al_2O_3$ | MgO | CaO |
|---|---|---|---|---|---|---|---|---|
| magnetite | 69.1 | — | 1.5 | 93.7 | 1.5 | 0.30 | 0.60 | 0.61 |
| Hematite | 68.08 | 0.06 | 97.26 | — | 0.41 | 0.07 | 0.06 | 0.03 |
| Mill scale | 74.88 | 67.5 | 32.6 | — | 0.09 | 0.06 | 0.003 | 0.10 |

(wt. %)

I, the inventor of this invention, have, therefore, examined the cross-sectional structure of oxidized magnetite and mill scale, and found that it consists of a surface layer of $Fe_2O_3$ having a depth of six microns or below, and an inner layer composed of a mixture of FeO and $Fe_3O_4$. I have concluded that it is due to this structure that the oxidized material requires a great deal of crushing time, and that when it is calcined, the iron oxide and the strontium oxide or carbonate fail to undergo a complete ferritizing reaction.

There is a great demand for a magnet of ferrite having a high level of performance which can be used in an electric motor for an automobile. There is, however, not known any magnet of this type having satisfactory properties. The known magnets have only a value of Br ranging from 4.0 to 4.2 kG, a value of Hc ranging from 3.3 to 3.7 kOe, a value of $(BH)_{max}$ ranging from 3.8 to 3.9 MGOe, and a value of iHc ranging from 3.6 to 3.9, at best.

SUMMARY OF THE INVENTION

It is, therefore, an object of this invention to provide a process for producing an improved magnet of strontium ferrite having the properties which are by far superior to those of the known magnets, and which render it particularly suitable for use in an electric motor for an automobile.

This object is essentially attained by a process which comprises pulverizing a magnetite or mill scale to prepare a fine powder having an average particle diameter not exceeding 12 microns, heating the powder at a temperature of 600° C. to 900° C. in an atmosphere containing oxygen or in the air to oxidize it to form iron oxide containing at least 98.0% of $Fe_2O_3$, mixing the iron oxide with strontium oxide or carbonate, calcining their mixture, pulverizing the calcined mixture, molding the pulverized mixture in a magnetic field, and sintering the molded material.

The process of this invention can produce a magnet having a value of Br ranging from 4.0 to 4.2. kG, a value of Hc ranging from 3.7 to 3.9 kOe, a value of $(BH)_{max}$ ranging from 3.8 to 4.2 MGOe and a value of iHc ranging from 4.0 to 4.2 kOe.

Other features and advantages of this invention will become apparent from the following description.

DETAILED DESCRIPTION OF THE INVENTION

The magnetite or mill scale is pulverized to form a powder having an average particle diameter not exceeding 12 microns before it is oxidized. If its average particle diameter exceeds 12 microns, the oxidized material is likely to contain FeO and $Fe_3O_4$ in its particles, it is likely that its mixture with the strontium compound may not undergo any satisfactory ferritization when it is calcined.

The magnetite or mill scale is oxidized by heating at a temperature of 600° C. to 900° C. At any temperature below 600° C., the FeO and $Fe_3O_4$ which the magnetite or mill scale contains may not be satisfactorily converted to $Fe_2O_3$. At any temperature exceeding 900° C., it is likely that the magnetite or mill scale may partly melt and undergo an undesirable growth of particles which will have an adverse effect on the efficiency of any subsequent crushing work. Moreover, the use of any temperature exceeding 900° C. is a waste of energy.

The magnitite or mill scale to be oxidized is heated preferably for a period of time ranging from 0.1 to 1.5 hours. If the heating time is shorter than 0.1 hour, no satisfactory oxidizing reaction takes place, and if it exceeds 1.5 hours, there occurs a sintering reaction resulting in an undesirable growth of particles.

The preparation of iron oxide containing at least 98.0% of $Fe_2O_3$ by oxidation is essential for the production of a magnet having a high level of performance for which this invention is intended. It is critically dependent upon the particle diameter to which the magnetite or mill scale is pulverized before it is oxidized, and its oxidizing temperature and time, as hereinabove stated.

The mixture of the iron oxide and strontium oxide or carbonate may be molded in a vertical or horizontal magnetic field. The use of a horizontal magnetic field is, however, preferred in view of the ease of mass production and the limitations imposed by the dimensions of the product to be made. The molding is preferably carried out by employing a magnetizing force of 7 to 15 kOe and a molding pressure of 0.3 to 0.6 kg/cm².

The molded material is preferably sintered in an oxidizing atmosphere using a temperature of 1200° C. to 1270° C. and a residence time of 0.5 to 1.5 hours.

The material according to this invention may contain not more than 2% of at least one of $SiO_2$, CaO, $Al_2O_3$, CoO and NiO, too, to achieve still improved sintering and magnetic properties.

If the magnetite or mill scale contains impurities such as $TiO_2$, MgO and $SiO_2$, it is necessary to remove them by, for example, magnetic separation or flotation before pulverizing it.

The invention will now be described more specifically with reference to several examples.

EXAMPLE 1

Particulate magnetite produced in Sweden and having the composition shown in TABLE 2 was used as an iron ore. It was pulverized to prepare a powder having an average particle diameter of five microns. The powder was put in a rotary kiln and oxidized at 800° C. for an hour in the presence of air, whereby iron oxide containing 99.5% of $Fe_2O_3$ was obtained. The iron oxide was pulverized to form a fine powder having an average particle diameter of 1.3 microns. The iron oxide and $SrCO_3$ were mixed in such proportions as would eventually yield a ferrite consisting essentially of $Fe_2O_3$ and SrO having a molar ratio of 6.0:1.0. The mixture was pelletized and calcined at 1300° C. for an hour. After the material had been coarsely crushed, 0.5% of $SiO_2$, 0.15% of $Al_2O_3$, 0.3% of CoO and 0.5% of CaO were added to it. The mixture was pulverized to form a fine powder having an average particle diameter of 0,85 micron. The powder was molded at a pressure of 0.5 ton/$cm^2$ in a horizontal magnetic field having a magnetizing force of 8 kOe. The molded material was sintered at 1250° C. for an hour in the presence of air, whereby a magnet of strontium ferrite was obtained. Its magnetic properties were as shown in TABLE 4.

TABLE 2

| Composition of magnetite (wt. %) | | | | | | | | |
|---|---|---|---|---|---|---|---|---|
| T.Fe | FeO | $Fe_2O_3$ | $Fe_3O_4$ | $SiO_2$ | $Al_2O_3$ | CaO | MgO | $TiO_2$ |
| 70.46 | — | 1.6 | 93.6 | 1.00 | 0.16 | 0.44 | 0.35 | 0.38 |

EXAMPLE 2

Mill scale having the composition shown in TABLE 3 was mechanically pulverized to from a powder having an average particle diameter of six microns. The powder was put in a rotary kiln and oxidized at 800° C. for an hour in the presence of air, whereby iron oxide containing 99.2% of $Fe_2O_3$ was obtained. The iron oxide was pulverized to form a powder having an average particle diameter of two microns. The iron oxide was mixed with $SrCO_3$ and after the mixture had been pelletized, it was calcined at 1300° C. for an hour in the presence of air. After the calcined material had been crushed to form a powder having an average particle diameter of four microns, 0.5% of $SiO_2$, 0.15% of $Al_2O_3$, 0.3% of CoO and 0.5% of CaO were admixed with it. The mixture was pulverized to form a fine powder having an average particle diameter of 0.75 micron. The powder was molded at a pressure of 0.48 ton/$cm^2$ in a horizontal magnetic field having a magnetizing force of 7.5 kOe. The molded material was sintered at 1250° C. for an hour in the presence of air, whereby a magnet of strontium ferrite was obtained. Its magnetic properties were as shown in TABLE 4.

TABLE 3

| Composition of mill scale (wt. %) | | | | | | | |
|---|---|---|---|---|---|---|---|
| T.Fe | FeO | $Fe_2O_3$ | $Fe_3O_4$ | $SiO_2$ | $Al_2O_3$ | MgO | CaO |
| 75.3 | 72.44 | 27.18 | — | 0.11 | 0.06 | 0.005 | 0.12 |

COMPARATIVE EXAMPLE 1

Mill scale having the composition shown in TABLE 3 was mechanically pulverized to form a powder having an average particle diameter of 15 microns. The oxidizing and ferritizing procedures of EXAMPLE 2 were followed to produce a magnet of strontium ferrite. Its magnetic properties were as shown in TABLE 4. The iron oxide obtained by the oxidation of the mill scale contained only 59% of $Fe_2O_3$.

COMPARATIVE EXAMPLE 2

The procedures of EXAMPLE 2, except for the preliminary pulverizing of mill scale, were followed for producing a magnet of strontium ferrite from the mill scale having the composition shown in TABLE 3. The iron oxide obtained by the oxidation of the mill scale contained only 30% of $Fe_2O_3$. TABLE 4 shows the magnetic properties of the magnet which was obtained.

TABLE 4

| | Magnetic properties | | | |
|---|---|---|---|---|
| | Br (kG) | Hc (kOe) | $(BH)_{max}$ (MGOe) | iHc (kOe) |
| EXAMPLE 1 | 4.00 | 3.73 | 3.80 | 4.03 |
| EXAMPLE 2 | 4.14 | 3.85 | 4.10 | 4.12 |
| COMPARATIVE EXAMPLE 1 | 4.13 | 3.56 | 4.09 | 3.83 |
| COMPARATIVE EXAMPLE 2 | 4.09 | 3.28 | 4.02 | 3.66 |

As is obvious from the results of EXAMPLES 1 and 2 shown in TABLE 4, the process of this invention enables the production of magnets of strontium ferrite having values of Br, Hc, $(BH)_{max}$ and iHc falling within the ranges which define the optimum magnetic properties of magnets for use in electric motors for automobiles.

What is claimed is:

1. A process for producing a magnet having a value of Br ranging from 4.0 to 4.2 kG, a value of Hc ranging from 3.7 to 3.9 kOe, a value of $(BH)_{max}$ ranging from 3.8 to 4.2 MGOe and a value of iHc ranging from 4.0 to 4.2 kOe comprising:

crushing a material selected from magnetite and mill scale to form a powder having an average particle diameter not exceeding 12 microns;

subjecting thus formed powder to an oxidizing treatment at a temperature of 600° C. to 900° C. in $O_2$ containing atmosphere or ambient atmosphere to oxidize the powder to form an iron oxide containing at least 98.0% of $Fe_2O_3$;

mixing thus formed iron oxide with a material selected from strontium oxide and strontium carbonate;

calcining the mixture to form a ferrite;

crushing coarsely the calcined mixture;

mixing the coarsely crushed mixture with not more than 2% of at least one additive of $SiO_2$, CaO, $Al_2O_3$, CoO and NiO;

pulverizing the resultant mixture;

molding the pulverized mixture in a magnetic field; and sintering the molded mixture.

2. A process as set forth in claim 1, wherein said ferrite consists essentially of $Fe_2O_3$ and $SrO$ having a molar ratio of 5.6 to 6.2:1.0.

3. A process as set forth in either claim 1 or claim 2, wherein said oxidizing treatment is carried out for a period of time ranging from 0.1 to 1.5 hours.

4. A process as set forth in claim 3, wherein said magnetic field has a magnetizing force of 7 to 15 kOe and said molding is carried out at a pressure of 0.3 to 0.6 $kg/cm^2$.

5. A process as set forth in claim 4, wherein said sintering is carried out in an oxidizing atmosphere by employing a temperature of 1200° C. to 1270° C. and a residence time of 0.5 to 1.5 hours.

* * * * *